US008626450B2

(12) United States Patent
Dooley

(10) Patent No.: US 8,626,450 B2
(45) Date of Patent: Jan. 7, 2014

(54) METHOD FOR DETERMINATION OF CARBON DIOXIDE EMISSIONS FROM COMBUSTION SOURCES USED TO HEAT A WORKING FLUID

(75) Inventor: Matthew Joseph Dooley, Granby, CT (US)

(73) Assignee: ALSTOM Technology Ltd, Baden (CH)

( * ) Notice: Subject to any disclaimer, the term of this patent is extended or adjusted under 35 U.S.C. 154(b) by 261 days.

(21) Appl. No.: 12/781,060

(22) Filed: May 17, 2010

(65) Prior Publication Data

US 2010/0312490 A1      Dec. 9, 2010

Related U.S. Application Data

(60) Provisional application No. 61/184,136, filed on Jun. 4, 2009, provisional application No. 61/244,278, filed on Sep. 21, 2009.

(51) Int. Cl.
*G01N 31/00*     (2006.01)

(52) U.S. Cl.
USPC .............................. 702/24; 122/414; 122/459

(58) Field of Classification Search
USPC .................... 702/24; 122/414, 459
See application file for complete search history.

(56) References Cited

U.S. PATENT DOCUMENTS

| | | | | |
|---|---|---|---|---|
| 6,522,994 B1* | 2/2003 | Lang | ............................. | 702/183 |
| 2005/0150230 A1* | 7/2005 | Rollins | ........................... | 60/772 |
| 2006/0032788 A1* | 2/2006 | Etter | ............................. | 208/131 |
| 2007/0184556 A1* | 8/2007 | Wang | ........................... | 436/143 |

OTHER PUBLICATIONS

Dukelow et al., Chapter 8. Control and Optimization of Unit Operations, Instrument Engineers' Handbook, Fourth Edition, vol. Two Process Control and Optimization, Edited by Béla G. Lipták CRC Press, pp. 1572-1629.*
EPA, Direct Emmisions from Stationary Combustion Sources, EPA430-K-08-003, May 2008, pp. 1-31 www.epa.gov/climateleaders.*
Capehart et al., Chapter 8 "Steam Generation and Distribution", Guide to Energy Management 4th Edition, 2003, pp. 1-43 (note: pages renumbered in the provided .pdf) CRC e-book.*
Prabir Basu et al.: "Boilers and Burners—Design and Theory" Jan. 1, 2000, Springer, New York Berlin Heidelberg, XP55005395, pp. 21-51.
American Society of Mechanial Engineers, American National Standard, ASME ptc Apr. 1998 "Fired Steam Generators", "Section 5—Computation of Results" pp. 75-133, copyright 1999.

* cited by examiner

*Primary Examiner* — Jonathan C. Teixeira Moffat
*Assistant Examiner* — Regis Betsch

(57) ABSTRACT

A method for determining carbon emissions from a steam generation system is disclosed. It includes measuring a first energy of feedwater entering into a steam generation system and measuring a second energy of steam exiting the steam generation system. The first energy is subtracted from the second energy to determine a total energy absorbed by the steam generation system. The total energy absorbed by the steam generation system is divided by the total energy to determine a heat input to the steam generation system. The heat input is used to determine the carbon emissions from the steam generation system.

30 Claims, 3 Drawing Sheets

METHOD FOR DETERMINATION OF CARBON DIOXIDE EMISSIONS FROM COMBUSTION SOURCES USED TO HEAT A WORKING FLUID

CROSS-REFERENCE TO RELATED APPLICATIONS

This application claims priority to provisional application 61/184,136 filed on Jun. 4, 2009, and to provisional application 61/244,278 filed on Sep. 21, 2009, the entire contents of which are hereby incorporated by reference.

BACKGROUND

This disclosure is related to a method for determination of carbon dioxide emissions from steam generation systems used to heat a working fluid.

As the world grows more concerned with the emissions of greenhouse gases, and carbon dioxide in particular, there is a growing need to quantify these emissions as accurately as possible so that efforts can be targeted at reducing them. On method of reducing greenhouse gases is to improve existing technologies so that they become more efficient. However, even the best improvements in existing technology can at best result in reductions in greenhouse gas emissions that are of the order of a couple of percent. It is therefore important that the methods used to measure these reductions in emissions are precise enough so that the reductions can be accurately documented. If the methodology employed to determine and document these improvements has a high degree of uncertainty, the value of these improvements will almost certainly be lost.

Existing technologies use either the measurement of carbon dioxide and the flue gas flow rate in the stack or the calculation of carbon dioxide using fuel flow and carbon content in the fuel. In both cases, the measurement of flow yields significant uncertainty, generally greater than about 7% in the calculated carbon dioxide emissions. This is particularly true with solid fuels such as coal. This large uncertainty becomes even more problematic when differences are used to determine the change in carbon dioxide emissions.

It is therefore desirable to have a method that can accurately estimate the amount of carbon dioxide emitted from combustion processes. Only after the quantification of greenhouse emissions is accurately conducted can there be an actual determination of the efficacy of various methods to reduce the emissions of these gases.

SUMMARY

Disclosed herein is a method comprising measuring a first energy of feedwater entering into a steam generation system; measuring a second energy of steam exiting the steam generation system; subtracting a difference between the first energy and the second energy to determine a total energy absorbed by the steam generation system; dividing the total energy absorbed by the steam generation system by an efficiency of the steam generation system to determine a heat input to the steam generation system; and determining the carbon emissions from the heat input to the steam generation system.

Disclosed herein too is a method comprising calculating the total energy absorbed by a working fluid in a boiler as it undergoes a change of state; dividing the total energy absorbed by the boiler by an efficiency of the boiler to determine a heat input to the boiler; and determining carbon emissions from the heat input to the boiler.

DETAILED DESCRIPTION

Figure 1:
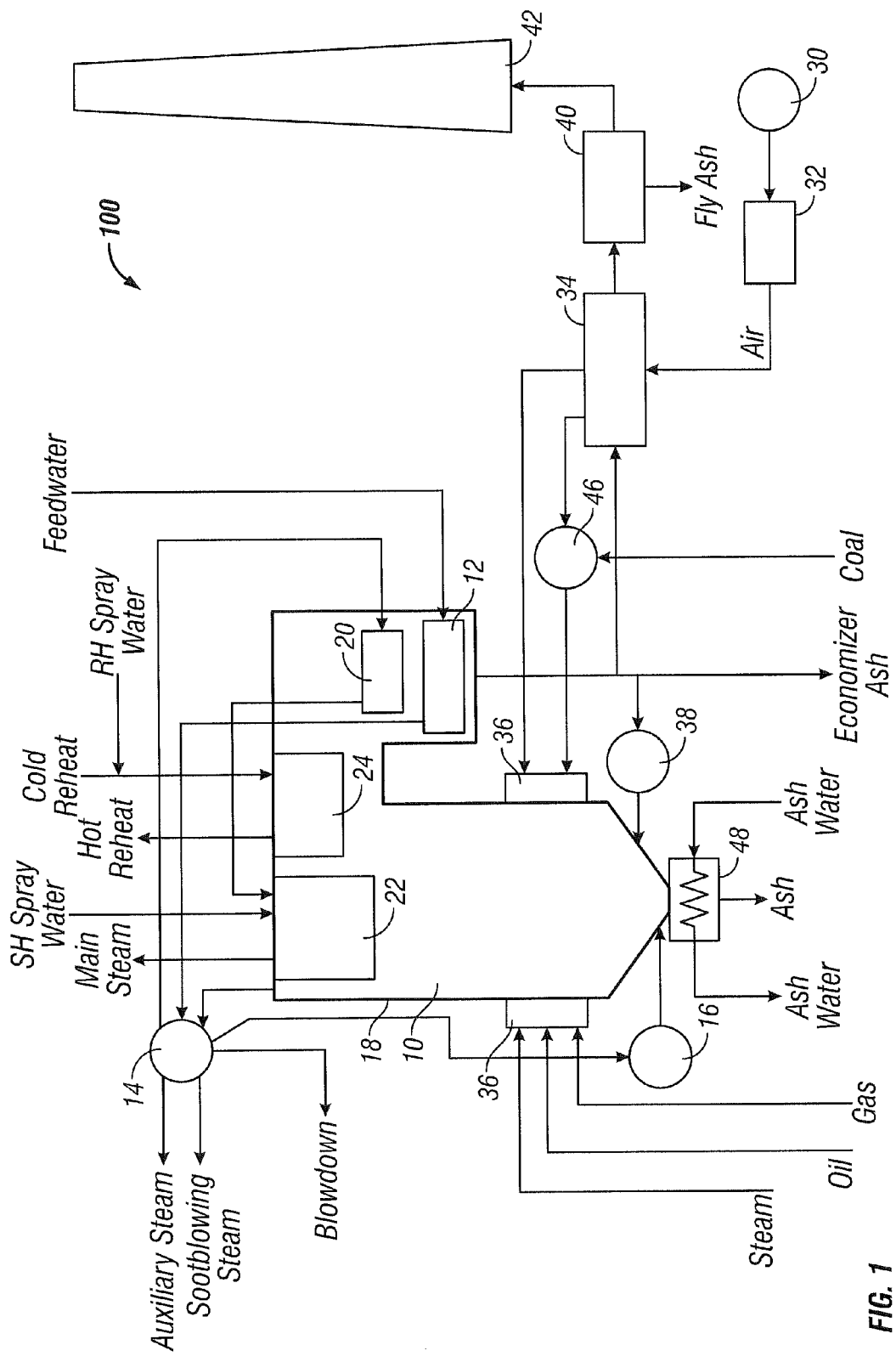
FIG. 1 is an exemplary depiction of a boiler used for steam generation.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention. As used herein, the term "and/or" includes any and all combinations of one or more of the associated listed items.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Disclosed herein is a method that can accurately estimate the amount of carbon dioxide emitted from a steam generation system. In one embodiment, the method comprises measuring the total energy absorbed by a working fluid in a steam generation system and dividing the total energy absorbed by the efficiency of the steam generation system to arrive at the total heat input. Carbon emissions can then be determined from the total heat input.

The working fluid can comprise water, ammonia, or the like. In one embodiment, the working fluid is water. In an exemplary embodiment, the method comprises measuring a first energy of the feedwater that is supplied to the steam generation system (e.g., at feedwater inlets) and a second energy of steam or hot water that exits the steam generation system at various points (e.g., at steam outlets) and subtracting the first energy from the second energy to provide a measure of the "energy absorbed" in the steam generation system. This energy absorbed is then divided by the efficiency of the steam generation system to determine the heat input. The heat input is then used to calculate the mass of carbon dioxide that is emitted to the environment.

This method is referred to as the energy balance method since it does not measure any direct carbonaceous inputs into the steam generation system, but rather estimates the carbon emissions from the flow of the working fluid into and out of the steam generation system. Since the temperature and pressure of the working fluid can be more accurately measured than the weight of fuel burned in the steam generation system or the amount of flue gases generated by the steam generation system, this method is more precise and more accurate.

The energy balance method or the heat loss method is so termed because it determines the carbon emissions from differences between the feedwater energy and the steam energy (when the working fluid is water) and the efficiency of the steam generation system and does not directly measure either the fuel input or the gaseous effluent. The energy balance method can be accurately used to determine carbon emissions in steam generators such as oil and gas fired steam generators, pulverized coal fired steam generators, circulating fluidized bed steam generators, stoker-coal fired steam generators, bubbling fluidized bed steam generators, and the like. An exemplary steam generation system for use in the foregoing steam generators is a boiler. The fuel used in the steam generation systems can be coal, pulverized coal, gasoline, heavy oil, diesel, and the like. This method differs from other methods of a similar nature for real time or online measurements by including an air heater and by measuring the flue gas oxygen content and flue gas temperature in a grid at the exit of the air heater. This inclusion improves the accuracy of the method and enables continuous determination of efficiency.

FIG. 1 is an exemplary depiction of a boiler 10 in a steam generation system 100. The steam generation system 100 will hereinafter be referred to as a boiler system 100. The steam generation system 100 is comprised of an air system, a fuel system, a flue gas system and a steam and water system. The air system consists of an inlet duct system, which comprises fans 30, air preheaters 32, 34 and windbox and burners 36. This inlet duct system is further comprises an air preheater 32, which heats the air prior to the air entering the main airheater 34, which heats air prior to discharging it into the fuel system (pulverizers), windbox and burners 36.

The windbox and burners 36 are part of the boiler 10 having a gas tight enclosure where the fuel is combusted. The boiler 10 is made up waterwalls 18 where the water is boiled to steam. The steam and water system comprises piping and heat transfer surfaces used to transfer the heat from the combusted fuel and air to the water and steam. Feedwater enters the steam and water system in the economizer 12, which heats the feedwater and then sends it to a steam drum 14 where it is mixed with the water circulating in the furnace waterwalls 18. Water is circulated in the waterwalls using either natural circulation or with a circulation pump 16, until sufficient energy converts it to a vapor. This water vapor or steam leaves the steam drum and is directed to a primary superheater 20, and then a finishing superheater 22. The superheaters raise the temperature above the saturation temperature before the steam leaves the boiler and goes to a steam turbine to generate power or to a process to perform useful work.

A steam desuperheating station, sometimes called an attemperator is used to control the steam temperature and prevent overheating of the system metals. In this case water is sprayed into the desuperheater to cool the steam by evaporation. Spray water is injected into the secondary superheater 22, while main steam is removed from the secondary superheater 22. Steam from the boiler is also transported to the drum 24 and is used as auxiliary steam. Water may be withdrawn as blowdown when needed to improve water quality.

In the case of a power generation facility, a portion of the steam may return to be reheated and then returned to the steam turbine. The reheat portion of the steam and water system comprises heat transfer surfaces 24 used to raise the steam temperature before returning it to the steam turbine. The combustion products leaving the economizer are called flue gases and enter the flue gas system. The flue gas system comprises a hot air quality control system (AQCS), and if applicable, the flue gas side of the air preheater 34 comprises a particulate control device 40 and possibly additional AQCS equipment. Flue gases therefore travel through the hot air quality control system and the particulate control device 40 before being admitted to the atmosphere through a stack 42. In some boiler configurations, a gas recirculation fan 38 is used to recirculate a portion of the flue gases to the furnace to improve heat transfer.

Fuel (e.g., pulverized coal) and air are introduced into the boiler 10 through the burners 36. Oil and gas may also be introduced into the windbox through burners 36 to facilitate ignition of the fuel or as a main fuel. Flue gases generated in the boiler 10 are used to heat feedwater into steam, which is then used to drive a power generator. The flue gases are then vented to a stack 42 via an air heater 34. Ash generated by the combustion of fuel is removed from the bottom of the boiler 10. Fly ash generated by the boiler 10 is removed by particulate control device 40 located either on the hot side of the air preheater 34 or following the air preheater as shown. Ash from the economizer may also be removed as depicted in the FIG. 1.

With regard to the FIG. 1, the boiler system 100 comprises three main systems an air and flue gas system, a fuel system and the steam and water system. In the air and flue gas system, air is drawn into a fan or fans 30, referred to as forced draft fans (FD Fans) and then directed to an inlet duct system that may direct this air to an air preheater 34. Air, from this air preheater 34, or in the absence of an air preheater 34, is directed to a windbox and burners 36 where fuel is mixed with air for combustion and combusted in the boiler 10. This flue gas is then passed over the heat transfer surfaces of the air preheater 34 and to pollution control equipment before being discharged to the atmosphere.

The fuel system is dependant upon the type of fuel fired in the boiler system. Gaseous fuels are the simplest with the gas being supplied directly to a burner. Oil systems may heat the oil for transport and or heat steam for atomization. Solid fuel is generally burned in three arrangements—stoker or travelling grate, fluidized bed or pulverized coal. In a pulverized coal system, coal is ground to a fine powder in a pulverizer where hot air is also introduced to dry the coal and transport it to the burner 36 and the boiler 10 for combustion. The air temperature entering the pulverizer is controlled by mixing the hot air from the air heater with un-heated air.

In the steam water system, water is heated first in an economizer 12 and is then introduced into a steam drum 14 where a water steam mixture is circulated through the furnace waterwalls and back to the steam drum 14, which separates the vapor from the liquid. The liquid is recirculated to the waterwalls 18 while the vapor is sent to the primary superheater 20 for additional heat transfer. In the case of a super critical boiler or a plain water heater, no steam drum is used since there is no significant density difference between the inlet and outlet fluids. Steam from the primary superheater 20 is sent to other superheating surfaces depending upon the design of the boiler source. In many cases a steam desuperheater (or an attemperator), is used as a control on the final steam temperature. In some unit designs there may be more than one desuperating or attemperating stage. In many boiler designs a reheating section is incorporated. This section takes steam that has been used in the process and reheats it prior to return to the process. The heat transfer surfaces for this reheating are intermixed in the flue gas stream with the main steam superheaters.

In order to determine the carbon emissions from the boiler, it is desirable to measure the temperature and pressure of the steam. Since the temperature and pressure of steam can be easily and accurately measured, the enthalpy of the steam or water can also accurately be determined. The mass and the enthalpy of steam at various points from the boiler can be measured and used to determine the energy of steam by using the equation Q=MH, where M is the mass, H is the specific enthalpy. By determining the difference between the energy of steam at various points from the boiler and the energy of the feedwater entering the boiler the energy absorbed by the steam and water can be determined. The efficiency of the boiler is defined by the energy absorbed by the steam and water divided by the heat fired in the boiler. Therefore dividing the energy in the steam and water by the efficiency of the boiler, the heat input to the boiler can be estimated. The heat input to the boiler can be used to estimate carbon emissions.

A large number of equations will follow this section. These equations are used to determine the carbon emissions based on energy differences between the steam and the feedwater. The following nomenclature table will be useful to the reader for determining the meaning of various terms used in the following equations. As will be seen in the following equations, there are a number of terms that are strung together. The meaning of these combined terms may be estimated using the Table 1.

TABLE 1

| Term | Description |
|---|---|
| A | Air |
| Ad | Additional |
| Ap | Ashpit |
| AsF | Ash in fuel |
| Bd/bd | Blow down steam |
| BLR | boiler |
| C/Cr | Carbon |
| Cb | Combustion |
| Cb | Carbon burned |
| CF | Carbon in fuel |
| $C_{FA}$ | Carbon in flyash |
| Cl | Calcinations |
| CR | Combustibles in refuse |
| Cr | Corrected |
| D | Dry |
| DA | Dry air |
| DPc | Dry products of combustion |
| DR | Dry refuse |
| $DvpO_2$ | Dry percentage oxygen on a volume basis |
| Em | Emissions |
| En | Entering |
| F | Fuel |
| FA | Flyash |
| Fg | Flue gas |
| Fr/fr | Fraction |
| FW | Feedwater |
| H | Enthalpy |
| Hc | Hydrocarbons |
| $H_2OF$ | Water in fuel |
| $HF/H_2F$ | Hydrogen in fuel |
| HHV | Higher heating value |
| Hrk | |
| L | Loss |
| Lv | Leaving |
| M | Mass |
| Me | Mass of emissions per kW |
| Mte | Mass of emissions on a ton per hour basis |
| Mn | Mean |
| Mo | Moles |
| Mp | Mass percent |
| Mq | Mass in lbs per BTU |
| MS | Main steam |
| $MS_{spray}$ | Main steam spray |
| Mw | Molecular weight |
| NF | Nitrogen in fuel |
| OF | Oxygen in fuel |
| Pr | Pulverizer rejects |
| Q | Energy |
| R | Refuse |
| r | Rate |
| Re | Reference |
| RH | Reheat Steam |
| Rs | residue |
| Rs | Recycle stream |
| Ry | Recycled |
| Sb | Sorbent |
| Sb/SB/sb | Soot blowing steam |
| Slf | Sulfation |
| SF | Sulfur in fuel |
| Th | Theoretical |
| Ub | Unburned |
| Vaz | Air velocity near surface |
| $VpO_2$ | Percentage oxygen on a wet volume basis |
| W | Wet |
| WA | Wet air |
| WPc | Wet products of combustion |
| Wv | Water vapor |
| X | Excess |
| z | Location identifier |
| η | Efficiency |

The energy absorbed in the main steam $Q_{MS}$ is provided in the Equation (1) below:

$$Q_{MS}=(M_{FW}-M_{SB}-M_{Bd}-M_{Aux})(H_{MS}-H_{FW}) \tag{1}$$

where $M_{FW}$ is the mass of the feedwater, $M_{SB}$ is the mass of the sootblowing steam, $M_{Bd}$ is the mass of the blowdown, $M_{Aux}$ is the mass of the auxiliary steam, $H_{MS}$ is the enthalpy of the main steam, $H_{FW}$ is the enthalpy of the feedwater. The mass of the feedwater is a primary measurement from station instruments that is confirmed by comparison to the condensate flow by an energy balance around the deaerator. The mass flow of the sootblowing and auxiliary steam flows, if applicable and in service are secondary flows where the accuracy may be less critical to the overall accuracy of the method. The blowdown flow, if in service is also of secondary importance, and may be estimated by the opening of a valve and a flow characteristic of the valve. The enthalpy of the steam or water streams are determined by using the ASME steam tables based on the measured temperature and/or pressure. Blowdown enthalpy is based upon the saturated liquid at the drum pressure, unless a blowdown cooler is employed in the cycle, and then the discharge from the cooler as it leaves the cycle will be used.

The energy absorbed in the sootblowing steam is provided in the Equation (2) below:

$$Q_{SB} = M_{SB}(H_{sb} - H_{FW}) \quad (2),$$

where $M_{SB}$ and $H_{FW}$ are indicated above and $H_{sb}$ is the enthalpy of the sootblowing steam.

The energy absorbed in the blowdown steam is provided in the Equation (3) below:

$$Q_{Bd} = M_{Bd}(H_{bd} - H_{FW}) \quad (3),$$

where $M_{Bd}$ and $H_{FW}$ are indicated above, and $H_{bd}$ is the enthalpy of the blowdown steam. The energy absorbed in any auxiliary steam is provided in the Equation (4) below:

$$Q_{AUX} = M_{AUX}(H_{AUX} - H_{FW}) \quad (4),$$

where $M_{AUX}$ and $H_{FW}$ are indicated above, and $H_{AUX}$ is the enthalpy of the auxiliary steam. The energy absorbed by sprays to the main steam is provided in equation (5) below:

$$QrMSspray = MrMSspray(H_{MS} - H_{MSspray}) \quad (5),$$

where QrMSspray and MrMSspray are the energy rate of the spray to the main steam and the mass rate of the spray to the main steam respectively, $H_{MS}$ is as indicated above and $H_{MSspray}$ is the enthalpy of the main steam spray. The energy absorbed in the reheat steam is provided in the Equation (6) below:

$$QrRH = MrCRH(H_{HRH} - H_{CRH}) \quad (6),$$

where QrRH and MrCRH are the energy rate and the mass rate of the reheat steam respectively and $H_{HRH}$ and $H_{CRH}$ are the enthalpy of the hot reheat steam and the cold reheat steam respectively. The mass rate of the cold reheat CRH is determined from the mass flow of the main steam MrMS less the estimated leakage rate in the high performance (HP) turbine and any extractions from the turbine or the exhaust prior to re-admission to the boiler. Extractions to the feedwater heaters are calculated from a heat balance around the heater. A heat balance around the heater consists of the energy given up by the extraction steam is equal to the energy absorbed by the feedwater. The energy absorbed by sprays to the reheat steam are provided in the Equation (7) below:

$$QrRHspray = MrRHspray(H_{HRH} - HRH_{RHSpray}) \quad (7)$$

where QrRHspray and MrRHspray are the enthalpy rate and the mass rate for the spray to the reheat steam, $H_{HRH}$ and $HRH_{RHSpray}$ are the enthalpy for the hot reheat steam and the enthalpy for the spray for the reheat steam respectively.

The total energy absorbed in the boiler may be calculated using the equation (8) below, where the energies from the Equations (1) through (7) are added together. The Equations (5) through (7) are normalized to remove the rates.

$$Q_{BLR} = Q_{MS} + Q_{MSspray} + Q_{Bd} + Q_{SB} + Q_{AUX} + Q_{RH} + Q_{RHspray} \quad (8),$$

where $Q_{MS}$, $M_{MSspray}$, $Q_{Bd}$, $Q_{SB}$, $Q_{AUX}$, $Q_{RH}$ and $Q_{RHspray}$ have the meanings indicated above. Following the determination of the total energy absorbed by the boiler and the determination of the boiler efficiency as per ASME PTC 4-2008 energy balance method, the heat supplied to the boiler may be determined using the relationship shown in the Equations (9) or (10)

$$HeatInput = \frac{EnergyAbsorbed}{BoilerEfficiency}, \quad (9)$$

$$Q_{FIRED} = \frac{Q_{BLR}}{\eta_{BLR}}, \quad (10)$$

where $Q_{FIRED}$ of the Equation (10) is the Heat Input of the Equation (9), $Q_{BLR}$ of the Equation (10) is the Energy Absorbed of the Equation (9) and $\eta_{BLR}$ of the Equation (10) is the Boiler Efficiency of the Equation (9). As noted above, the efficiency of the boiler can be calculated using the calculation methodology provided by American Society of Mechanical Engineers Performance Test Code 4-2008 methodology (ASME PTC 4). This methodology will be detailed below.

Knowledge of the heat input can be used to determine the carbon emissions based on the weight of carbon dioxide per million brake thermal units (BTUs) and the fired heat input. The carbon emissions can be determined from the Equations (11), (12) and (13) below:

$$MqCO_2 = \frac{MFrCF}{HHV} \times \frac{MW_{CO_2}}{MW_C} \times 10^6 \quad (11)$$

pounds of carbon dioxide per million $BTU$, $$MeCO_2 = \frac{MqCO_2}{kW} \times Q_{FIRED} \text{ pounds of carbon dioxide per kilowatt,} \quad (12)$$

and $$MteCO_2 = \frac{MqCO_2}{2000} \times Q_{FIRED} \text{ tons of carbon dioxide per hour,} \quad (13)$$

where $MqCO_2$, $MeCO_2$ and $MteCO_2$ are masses in pounds per BTU of carbon dioxide, mass of carbon dioxide emissions on a per kW basis and mass of carbon dioxide emissions on a ton per hour basis respectively, MFrCF is the mass fraction of carbon in the fuel, $MqCO_2$ is a mass in pounds per BTU of carbon dioxide and $MW_{CO2}$ is the mass of carbon dioxide respectively, and $Q_{FIRED}$ is the heat input to the steam generation system. Other emissions can be estimated in a similar manner to the carbon emissions using the equations (14) and (15) below:

$$MeEm = \frac{MqEm}{kW} \times Q_{FIRED} \text{ lb } Em/kW, \quad (14)$$

and $$MteEm = \frac{MqEm}{2000} \times Q_{FIRED} \text{ Em Tons}/hr, \quad (15)$$

where MeEm and MteEm represents the mass of emissions on a per kW basis and mass of emissions on a ton per hour basis respectively, and where $Q_{FIRED}$ has the same meaning as indicated above. In one embodiment, the equations (14) and (15) can be used to estimate the amounts of nitrogen oxides, sulfur dioxides, carbon monoxide and other emissions.

The fuel flow to the boiler may be determined by Equation (15a) below:

$$M_{fuel} = \frac{Q_{FIRED}}{HHV \times 2000} \text{ tons per hour} \quad (15a)$$

The American Society of Mechanical Engineers Performance Test Code 4-2008 Fired Steam Generators (ASME PTC 4-2008) is the American National Standards Institute (ANSI) for the determination of steam generator efficiency. This standard defines efficiency as "fuel efficiency" and provides methodology for the determination of boiler or steam generator efficiency in accordance with the definition for a wide variety of steam generator designs. The methodology further provides two methods to determine efficiency, the input output method and the energy balance method. The ASME fuel efficiency is defined as the ratio of the output to the chemical energy in the fuel; output is defined as the energy recovered by the working fluid that is not recovered within the steam generator boundary.

The methodology described in this patent uses the output as determined in accordance with ASME-PTC 4 (2008) divided by the efficiency to determine the chemical energy (heat) fired in the fuel. The ASME PTC 4 2008 methodology is intended for performance guarantee type tests using test instrumentation and the collection of samples of fuel and ash during the course of the test. The calculations and computations described herein follow this methodology except that certain modifications are made to enable on-line, real time determination of efficiency and output. The code level test is intended to provide a result with a level of uncertainty of approximately 0.5%. The methodology described in this patent application uses fuel and ash analysis collected on a periodic basis for the basis of the calculations.

Since these samples are not taken during the time of the calculation, additional uncertainty is added to the computed results. In many instances, this uncertainty is minimal since the coal comes from a consistent source. Industry experience and published reports indicate that this would introduce an error of less than 0.1% to the heat input. Unburned carbon is evident in both the carbon in the ash as well as in the concentration of carbon monoxide (CO) in the flue gas. Most plants periodically measure the carbon in the ash, as this is an indication of the wear on coal pulverizers. Plants generally measure carbon monoxide as a pollutant. The magnitude of the carbon loss parameter is less that 1% and thus the variation of these parameters generally results in an impact on the heat input of less than 0.1%, even if the value is varied by more than 10%. Thus, periodically sampling the fuel and ash and maintaining a database of these analyses can make a high level of accuracy in the determination of the heat input. This historical record can then be used to establish an analysis that yields the lowest uncertainty in the result. This analysis will be conducted on a moisture and ash-free basis in addition to the as-received basis. The moisture and ash-free basis can than be adjusted by a more frequent moisture and ash analysis.

This methodology also uses an analysis of the fuel and the carbon in the ash streams and in the flue gas as carbon monoxide to determine the carbon burned. It can also be used to determine the theoretical air and the theoretical air corrected when using stoichiometric calculations. These determinations are conducted on either a pound per million BTU basis (i.e., pounds of carbon or air per million BTU's produced) or a pound per pound fuel basis (i.e., pounds of carbon or air per pound of fuel used). Most losses are determined on a percent loss per pound of fuel (BTU loss/HHV). Some losses are determined on a total BTU lost basis and are converted to a percent per pound of fuel by dividing an initial estimate of the fuel flow times the heating value. Determining of the losses uses an initial estimate of the fuel flow and recalculation when the efficiency has been determined.

In order to use the ASME PTC 4 methodology to determine the boiler efficiency, it is desirable to conduct an evaluation of various factors. These factors as listed below involve conducting an ultimate analysis of the coal (i.e., determining the mass percentage of the major constituents of coal such as carbon, hydrogen, nitrogen, oxygen, sulfur, moisture and ash), a proximate analysis of the coal (i.e. determining the fixed carbon, volatile matter, moisture, ash and higher heating value), computing the wet and dry products of combustion, determining the excess air level using the flue gas at both the air heater inlet and the outlet, calculating the products of combustion and the flue gas composition at both the air heater inlet and outlet, determining the enthalpies and calculating the temperature of the flue gas leaving the air heater corrected for no leakage amongst others. Samples of the ash or refuse from the steam generator are analyzed for the carbon content in the ash. As an alternative, many plants use a loss on ignition (LOI) procedure to estimate the carbon in the ash.

The ultimate analysis of coal and the ash analysis enable the determining the combustibles in the dry refuse, determining the carbon burned, determining the theoretical air and determining the theoretical air corrected for carbon burned.

The ultimate analysis of coal and the ash analysis enables the following Equations (16)-(23). Equation (16) measures the combustibles in the refuse.

$$CR = MpFA \times MpC_{FA} + MpBA \times MpC_{BA} \quad (16),$$

where CR is the combustibles in refuse, MpFA is the percentage of ash to flyash (i.e., the mass percentage of ash); $MpC_{FA}$ is the mass percent carbon in flyash, MpBA is the mass percent of bottom ash and $MpC_{BA}$ is the mass percent carbon in bottom ash. In the Equation (16), "Mp" indicates the "mass percentage" of the respective ingredient or product that it precedes in a given notation. It is to be noted that additional ash sources may be included by including their carbon content and the percent of the ash flow that is collected in the Equation (16). Ash distribution in a unit is generally estimated based on the unit design. For pulverized coal fired units since the fuel introduced into the furnace is very fine it is assumed that 80% of the ash leaves the furnace as fly ash while 20% falls to the bottom. Since most of the ash that falls to the bottom is the result of sootblowing of the waterwalls there is often little carbon in that ash and since the collection of this sample is often very difficult (or occasionally impossible) this often justifies an assumption of a low carbon value. Periodic samples of the ash may be taken and analyzed for carbon content. This information may be stored in a database. The most recent sample results may be used in the foregoing calculations. Storing and trending this information will not only provide information for the online system, but also assist in spotting erroneous or unrepresentative samples.

The dry refuse, which is the ash from the fuel and the unburned carbon is estimated in the Equation (17), carbon burned in the Equation (18), theoretical air in Equations (19)

and (20) and theoretical air for carbon burned in Equations (21) to (23). The dry refuse $$DR = \frac{MpAsF}{(1-CR)}, \quad (17)$$

where DR is the dry refuse, MpAsF is the mass percentage ash in the fuel, and CR is indicated in Equation (16) above. If applicable the solid precipitate from a fluidized bed reaction of limestone with the $SO_2$ is used in the above equation for the total dry refuse. The methodology from PTC 4 is incorporated by reference.

The mass percentage of carbon burned is $$MpCb = MpCF - \frac{DR \times CR}{100}, \quad (18)$$

where MpCb is the mass percentage of carbon burned, MpCF is the mass percentage of carbon in the fuel, DR and CR have their usual meanings indicated above.

The theoretical air can be determined by Equations (19), (19a) and (20) below:

$$MFrThA = 0.1151 \times MpCF + 0.3430 \times MpH_2F + 0.0431 \times MpSF - 0.0432 \times MpO_2F, \quad (19)$$

$$MFrThA\ cr = \begin{pmatrix} 0.1168 \times MpCb + \\ 0.3503 \times MpH_2F + \\ 0.0438 \times MpSF(1+.5MFrSc) - \\ 0.0441 \times MpO_2F \end{pmatrix} \times \left(\frac{100000}{HHV}\right) \quad (19a)$$

where MFrThA is the mass of theoretical air in pounds of air per pound of fuel dry basis, Equation 19a MFrThAw is the theoretical air on a wet basis. $MpH_2F$ is the mass percentage of hydrogen, MpSF is the mass percentage of sulfur and $MpO_2F$ is the mass percentage of oxygen.

$$MqThAf = \frac{MFrThA}{HHV}, \quad (20)$$

where MqThAf is the mass of theoretical air in pounds per BTU per pound of fuel, MFrThA is the mass of theoretical air in pounds of air per BTU and HHV is the higher heating value in BTU per pound.

The theoretical air corrected for carbon burned is given by the Equation (21) below:

$$MFrThACr = 0.1151 \times MpCb + 0.3430 \times MpH_2F + 0.0431 \times MpSF(1+0.5MFrSc) - 0.0432 \times MpO_2F \quad (21),$$

where MFrThACr is the theoretical air corrected for carbon burned in pounds per pound of fuel, where MFrSc is the mass fraction of sulfur capture (which is generally zero for non fluidized bed units) and where MpCb, $MpH_2F$, MpSF and $MpO_2F$ have their usual meanings indicated above. The Equation (21) can be expressed in the form of Equations (22) and (23)

$$MqThACr = \frac{MFrThACr}{HHV} \text{ in lbs per } BTU. \quad (22),$$

$$MoThACr = \frac{MFrThACr}{28.963} \text{ in moles per mass of fuel}, \quad (23)$$

where MqThACr and MoThACr represent the mass in lbs/BTU and the moles for the theoretical air corrected for carbon burned.

The theoretical air on a pound per million BTU basis is a good barometer of the quality of the fuel ultimate analysis. For all bituminous coal, a theoretical air on a wet basis (19a) of 765 pound per million BTU should be expected +/−2.6% (20 lb/million BTU). Thus, no matter how the coal varies, unless you are using a different rank coal, the maxim variation is +/−2.6% and it is highly unlikely that the variation will be from a sub-bituminous western coal to a bituminous eastern coal even if the plant buys coal on the spot market.

The wet and dry products of combustion are estimated using Equations (24), (25) and (26) below. The moles of dry products may be estimated from Equation (24) below:

$$MoDPc = \frac{MpCb}{12.01} + (1 - MfrSc)\frac{MpSF}{32.064} + \frac{MpNF}{28.013} + MoCO_2Sb, \quad (24)$$

where MoDPc is the number of moles of dry products, MpCb, MFrSc and MpSF are as indicated above, MpNf is the mass percentage of nitrogen in fuel and $MoCO_2Sb$ is the number of moles of carbon dioxide in a sorbent.

The number of moles of moisture per mole of dry air is estimated from Equation (25) below:

$$MoWA = 1.608 \times MFrWA \quad (25),$$

where MoWA represents the moles of moisture and where MFrWA is the specific humidity in pounds of water per pound of dry air. The number of moles of wet products of combustion may be estimated from Equation (26) below:

$$MoWPc = MoDPc + \frac{MpH_2F}{201.6} + \frac{MpWF}{1801.5} + \frac{MFrWAdz}{18.015} + MoWSb, \quad (26)$$

where MoWPc represents the moles of wet products of combustion, MoDPc, $MpH_2F$ and MFrWA are as indicated above. MpWF and MoWSb are the mass percent of the feedwater and the moles of the water in the sootblowing steam respectively.

The excess air level is determined using the measured percent oxygen in the flue gas at both the air heater inlet and the outlet. This is determined by the Equations (27) and (28) respectively.

$$XpA = 100\frac{DVpO_2(MoDPc + .7905 \times MoThACr)}{MoThACr(20.95 - DVpO_2)}, \quad (27)$$

where $DVpO_2$=percent oxygen on a dry volume basis and where Mo represents the number of moles of the term that it is a prefix to, MoDPc and MoThACr are the moles of dry products and the number of moles for theoretical air corrected for carbon burned. Excess air based on an oxygen volume wet basis is indicated by the Equation (28)

$$XpA = 100\frac{VpO_2(MoWPc + MoThACr(0.7095 + MoWA))}{MoThACr(20.95 - VpO_2(1 + MoWA))}, \quad (28)$$

where $VpO_2$ is the percentage of oxygen on a wet volume basis.

The products of combustion and the flue gas composition at both the air heater inlet and outlet are determined using stoichiometric calculations listed below. Subscript z denotes location specific information. The difference in the composition is the result of air leakage from the higher-pressure inlet to the lower-pressure outlet.

Dry air entering the boiler ahead of location z is estimated from the following equations (29) through (42).

$$MqDAz = MqThACr\left(1 + \frac{XpAz}{100}\right) \text{ pounds per } BTU, \tag{29}$$

where Mq represents the mass in pounds per BTU, MqDAz represents the mass in pounds per BTU of dry air at location z, MqThACr represents the mass in pounds per BTU of theoretical air in pounds per pound of fuel and XpAz represents the excess air based on an oxygen volume wet basis at location z.

$$MFrDAz = MFrThACr\left(1 + \frac{XpAz}{100}\right) \text{ pounds per pound of fuel} \tag{30}$$

The wet air entering the boiler ahead of location z is given by Equations (31) and (32)

$$MqAZ = (1 + MFrWA)MqDAz \text{ pounds per BTU} \tag{31}$$

$$MFrAZ = (1 + MFrWA)MFrDAz \text{ pounds per pound of fuel} \tag{32},$$

where the terms MqAz, MFrWA, MqDAz and MFrDAz are detailed above.

The wet gas from fuel may be determined from Equation (33) below.

$$MqFgF = \frac{(100 - MpAsF - MpUbC - MFrSc \times MpSF)}{100 \times HHV} \text{ pounds per } BTU \tag{33}$$

where the terms MqFgF is the mass in pounds per BTU of wet gas in fuel, MpAsF is the mass percent of ash in fuel, MpUbC is the mass percent of unburned carbon, MFrSc is the fractional mass of captured sulfur, MpSF is the mass percent of sulfur in fuel.

The moisture from water in fuel may be estimated in the Equation (34) as follows $$MqWF = \frac{MpWF}{100 \times HHV} \text{ pounds per } BTU, \tag{34}$$

where MqWF is the mass in pounds per BTU of water in fuel and MpWF is the percent mass of water in fuel.

The moisture from combustion of $H_2$ in fuel may be estimated in the Equation (35) as follows $$MqWH_2F = \frac{8.937 \times MpH_2F}{100 \times HHV} \text{ pounds per } BTU, \tag{35}$$

where $MqWH_2F$ is the mass in pounds per BTU of wet hydrogen in fuel and $MpH_2F$ is the percent mass of hydrogen in fuel.

The carbon dioxide gas from sorbent (if applicable, such as for a CFB type unit) may be estimated in the Equation (36) as follows $$MqCO_2b = \frac{MFrCO_2b}{HHV} \text{ pounds per } BTU, \tag{36}$$

where $MqCO_2b$ and $MFrCO_2b$ is the mass in pounds per BTU of carbon dioxide and the theoretical mass of the carbon dioxide respectively from the sorbent.

The water from the sorbent may be estimated from the Equation (37) as follows $$MqWSb = \frac{MFrWSb}{HHV}, \tag{37}$$

where MqWSb and MFrWSb are the mass in pounds per BTU of water in the sorbent and the fractional mass of the water in the sorbent.

The additional water (from sootblowing, atomizing steam, and the like, if applicable) is estimated from Equation (38) as follows $$MFrWADz = \frac{MrStz}{MrF}, \tag{38}$$

where MFrWADz is the fractional mass of moisture added per pound of fuel fired, MrStz is the mass flow rate of steam/water added and MrF is the mass flow rate of fuel (estimated initially).

$$MqWADz = \frac{MFrWADz}{HHV}, \tag{39}$$

where MqWADz is the mass in pounds per BTU of moisture added per pound of fuel fired.

The total moisture in the flue gas is provided in the Equation (40) by summing up the values of moisture obtained from the foregoing equations $$MqWFgz = MqWF + MqWvF + MqWH_2F + MqWSb + MqWAz + MqWADz \tag{40},$$

where MqWvF is the mass in pounds per BTU of water vapor in fuel. Water vapor in the fuel is present in a gaseous fuel.

The total wet flue gas weight in pounds per BTU is provided in the Equation (41), where $$MqFgz = MqDAz + MqWAz + MqFgF + MqCO_2Sb + MqWSb + MqWADz \tag{41},$$

The flue gas flow leaving the boiler is shown in Equation (42) below. The dry flue gas weight shown below in the Equation (42) is obtained by subtracting Equation (40) from Equation (41)

$$MqDFgz = MqFgz - MqWFgz \tag{42}.$$

The enthalpies are determined as discussed below. Enthalpies are determined based on the Joint Army Navy Air Force/North American Space Agency (JANAF/NASA) correlation as detailed in the ASME PTC 4 2008 publication. A Reference Temperature of 77° F. is use for the efficiency calculations, as specified in ASME PTC 4 2008, the JANAF equations are also referenced to 77° F. Enthalpies for dry flue gas in ASME PTC 4 2008 can be based on a composition of 15.3% $CO_2$, 3.5% $O_2$, 0.1% $SO_2$, and 81.1% $N_2$. Errors due to variation from this composition for combustion of fossil fuels are not significant if the excess air level is less than 300%. The method presented in this patent may use either the ASME PTC 4 correlation stated above or those computed from the individual components of the flue gas and combined on a weight composition basis. For non-standard fuels the individual component method should be used and combined on a weight basis.

The enthalpy due to water vapor is provided by Equation (43) below $$HWv = 0.4408 \times T + 2.381 \, E^{-5} \times T^2 + 9.638 \, E^{-9} \times T^3 - 3.41 \quad (43),$$

where HWv is the enthalpy of the water vapor and T is the temperature in degrees K.

The enthalpy of steam and water is provided in the Equations (44) and (45) below $$HSt = 0.4329 \times T + 3.958 \, E^{-5} T^2 + 1062.2 \quad (44),$$

$$HW = T - 32 \quad (45),$$

where HSt is the enthalpy of steam and HW is the enthalpy of water.

The enthalpy of residue is provided in the Equation (46) below $$HRs = 0.167 + 1.09 \, E^{-4} T^2 - 2.843 \, E^{-8} T^3 - 12.95 \quad (46),$$

where HRs is the enthalpy of residue.

The enthalpy of the dry flue gas is listed below in Equation (47) as $$HDFg = -0.1231899 \, E^3 + 0.4065568 \times Tk + 0.5795050 \, E^{-5} Tk^2 + 0.631121 \, E^{-7} Tk^3 - 0.2924434 \, E^{-10} Tk^4 + 0.2491009 \, E^{-14} Tk^5 \quad (47)$$

where HDFg is the enthalpy of the dry flue gas.

The enthalpy of the flue gas is listed in the Equation (48) as follows $$HFg = (1 - MFrWFg) HDFg + MFrWFg \times HWv + MFrRsFg \times HRs \quad (48)$$

where HFg is the enthalpy of the flue gas, MFrWFg is the fractional mass of the moisture in the flue gas, MFrRsFg is the fractional mass of the residue in the flue gas and where HDFg, HWv, and HRs are indicated above. MFrRsFg is only used when the concentration of ash is greater than 15 lm per million BTU. If used, see ASME PTC 4 2008 for calculation.

The temperature of the flue gas leaving the air heater is corrected for no leakage using Equations (49), (50) and (51)

Mean specific heat of air is provided in the Equation (49)

$$MnCpA = \frac{HATFgLv - HAEn}{TFgLv - TAEn} \, BTU/lb \, F \quad (49)$$

The mean specific heat of the flue gas is listed below in the Equation (50)

$$MnCpFg = \frac{HFgTFgLv - HFgTFgLvCr}{TFgLv - TFgLvCr} \, BTU/lb \, F \quad (50)$$

$$TFgLvCr = TFgLv + \frac{MnCpA}{MnCpFg} \left( \frac{MqFgLv}{MqFgEn} - 1 \right) \times (TFgLv - TAEn) \, °F \quad (51)$$

where HATFgLv is the enthalpy of air at flue gas leaving temperature, HAEn is the enthalpy of air at air entering temperature, TAEn is the temperature of air entering the air heater, TFgLv is the measured temperature of flue gas leaving the air heater, HFgTFgLv is the enthalpy of flue gas at flue gas leaving temperature, HFgTFgLvCr is the enthalpy of flue gas at flue gas leaving corrected temperature, MqFgLv is the total wet flue gas leaving air heater in pounds per BTU and MqFgEn is the total wet flue gas entering air heater in pounds per BTU.

This is an iterative calculation since the corrected temperature is used to determine the mean specific heat of the flue gas. A grid of thermocouples may be installed at the air heater air inlet, which will serve as the air inlet temperature. A station hygrometer may be used to provide online relative humidity. In most cases, carbon monoxide (CO), total hydrocarbons and hydrogen concentrations are negligible. If any are measured or determined to be significant, a non-zero value will be calculated from measured data or assigned.

The ASME PTC 4 methodology takes into consideration the following efficiency losses and credits. These losses and credits are listed as follows:

a) Losses
  i) Dry Gas Loss
  ii) Water from Fuel Loss
    (1) Loss due to water formed from combustion of hydrogen in fuel
    (2) Loss due to liquid water in fuel
    (3) Loss due to water vapor in a gaseous fuel—this loss is used for gaseous fuel only and is not used for solid or liquid fuels.
  iii) Loss due to moisture in air
  iv) Loss due to unburned combustibles
    (1) Loss due to unburned carbon
    (2) Loss due to unburned hydrogen—which may optionally not be applicable or is negligible
    (3) Loss due to carbon monoxide—generally negligible
    (4) Loss due to pulverizer rejects—an estimate will be input if applicable
  v) Loss due to sensible heat in residue
  vi) Loss due to hot air quality control equipment—which may optionally not be applicable
  vii) Loss due to air infiltration—will be included with hot air quality control system (AQCS) if applicable
  viii) Loss due to formation of nitrogen oxides ($NO_x$)
  ix) Loss due to surface radiation—an estimate is made based on ASME PTC 4 procedure to determine the BTU/hr loss, this loss is then factored in to determine a percentage.
  x) Loss due to additional moisture
  xi) Loss due to calcinations—which may optionally not be applicable
  xii) Loss due to water in sorbent—which may optionally not be applicable
  xiii) Loss due to wet ashpit—estimated as per ASME procedure
  xiv) Loss due to recycled streams—which may optionally not be applicable
  xv) Loss from cooling water—which may optionally not be applicable
  xvi) Loss due to internally supplied air preheating—which may optionally not be applicable
b) Credits
  i) Credit due to entering dry air
  ii) Credit due to moisture in air
  iii) Credit due to sensible heat in fuel
  iv) Credit due to sulfation—which may optionally not be applicable
  v) Credit due to auxiliary equipment power—which may optionally not be applicable vi) Credit due to sensible heat in sorbent—which may optionally not be applicable vii) Credit due to additional energy supplied by additional moisture The efficiency losses are calculated as follows:

i) The dry gas loss expressed as a percentage $$QpLDFg = 100 \times MqDFg \times HDFgLvCr \qquad (52)$$

where MqDFg is the weight in pounds of dry flue gas per BTU, HDFgLvCr is the enthalpy of dry flue gas at the corrected temperature leaving the air heater.

ii) Water from fuel loss may be classified into the following three categories determined by Equations (53), (54) and (55)

(1) Loss due to water formed from combustion of hydrogen in fuel $$QpLH_2F = 100 \times MqWH_2F(HStLvCr - HWRe) \qquad (53)$$

(2) Loss due to liquid water in fuel $$QpLWF = 100 \times MqWF(HStLvCr - HWRe) \qquad (54)$$

(3) Loss due to water vapor in a gaseous fuel $$QpLWvF = 100 \times MqWvF \times HWvLvCr \qquad (55)$$

where $MqWH_2F$ is the moisture from combustion of $H_2$ in fuel, HStLvCr is the enthalpy of steam at the corrected temperature leaving the air heater, HWRe is the enthalpy of water at reference temperature, and HWvLvCr is the enthalpy of water vapor at the corrected temperature leaving the air heater.

iii) The loss due to moisture in air is indicated in the Equation (56) below $$QpLWA = 100 \times MFrWA \times MqDA \times HWvLvCr \qquad (56)$$

where MFrWA is the specific humidity of air in pounds of water per pound of dry air, MqDA is the weight in pounds of dry air per BTU, and HWvLvCr is the enthalpy of water vapor at the corrected temperature leaving the air heater.

iv) Loss due to unburned combustibles (1) Loss due to unburned carbon is determined by Equation (57)

$$QpLUbC = MpUbC \frac{HHVCRs}{HHV} \qquad (57)$$

where MpUbC is the mass of unburned carbon per lb of fuel, HHVCr is the higher heating value of carbon in refuse and is equal to 14,500 BTU/lb, HHV=Higher Heating Value of fuel.

(2) Loss due to unburned hydrogen in residue (not normally present equation is used on for cases where hydrogen is detected) is determined by Equation (58)

$$QpLH_2Rs = \frac{MrRs \times MpH_2Rs \times HHVH_2}{MrF \times HHV} \qquad (58)$$

where MrRs is the mass rate of residue, $MpH_2Rs$ is the percent of $H_2$ in residue (mass weighted for multiple streams), $HHVH_2$ is the higher heating value of $H_2$ 61,100 BTU/lb, MrF is the fuel flow in lb/hr and HHV is the higher heating value of fuel.

(3) Loss due to carbon monoxide is determined by Equation (59), carbon monoxide is generally negligible from an efficiency perspective, however if a CO monitor is present it can readily be calculated.

$$QpLCO = DVpCO \times MoDFg \times MwCO \frac{HHVCO}{HHV} \qquad (59)$$

where DVpCO is the carbon monoxide dry volume, MoDFg are moles of dry flue gas per pound of fuel, MwCO is the molecular weight of carbon monoxide (28.01), HHVCO is the higher heating value of CO 4,347 BTU/lb and HHV is the Higher Heating Value of fuel.

(4) Loss due to pulverizer rejects are calculated using the Equations in (60)

$$MqPr = \frac{MrPr}{MrF} \qquad (60)$$

$$QpLPr = 100 MqPr(HHVPr + HPr)$$

where Mr Pr is the mass rate of pulverizer rejects, MrF is the fuel flow, HHV Pr is the heating value of pulverizer rejects from lab analysis, and H Pr is the enthalpy of pulverizer rejects (use Enthalpy of residue at mill outlet temperature.

(5) Loss due to unburned hydrocarbons is determined by Equation (61), unburned hydrocarbons are generally a negligible quantity, except in certain know processes where they can be accounted for as follows:

$$QpLUbHc = VpHc \times MoFg \times MwHc \frac{HHVHc}{HHV} \qquad (61)$$

where DVpHc is the total hydrocarbons in percent (%) dry volume, MoDFg are the moles of dry flue gas per pound of fuel, MWHc represents the molecular weight of hydrocarbons (molecular weight of reference gas used for analysis is generally propane 44.096 grams per mole), HHVHc is the higher heating value of reference gas used and HHV is the higher heating value of fuel.

v) Loss due to sensible heat in residue is determined by Equation (62)

$$QpLRs = 100 \Sigma MqRsz \times HRsz \qquad (62)$$

where MqRsz is the residue in pounds per BTU at specific location and HRsz is the enthalpy of residue at temperature of location.

vi) Loss due to hot air quality control equipment is determined by Equation (63)

$$QpLAq = 100[MqFgEn(HFgEn - HFgLv) - (MqFgLv - MqFgEn)(HAAqLv - HALvCr)] \qquad (63)$$

where MqFgEn is the mass of flue gas in pounds per BTU entering AQCS, MqFgLv is the mass of flue gas in pounds per BTU leaving AQCS, HFgEn is the enthalpy of flue gas at the entering temperature, HFgLv is the enthalpy of flue gas at leaving temperature, HAAqLv is the enthalpy of wet air at temperature of gas leaving the AQCS and HALvCr is the enthalpy of wet air at corrected temperature of gas leaving the air heater.

vii) Loss due to air infiltration between the normal boiler exit (e.g., the gas economizer outlet) and the air heater exit not included in the leakage into hot AQCS is determined by Equation (64)

$$QpLALg = 100 MqALg(HALvCr - HALgEn) \qquad (64)$$

where MqALg is the mass of air in pounds per BTU entering the air heater, HALgEn is the enthalpy of wet air at temperature of air entering air heater and HALvCr is the enthalpy of wet air at corrected temperature of gas leaving the air heater.

viii) Loss due to formation of NOx $$QpLNOx = DVpNOx \times MoDFg \frac{HrNOx}{HHV} \qquad (65)$$

where DVpNOx is the NOx % dry volume, MoDFg is the moles of dry flue gas per pound of fuel, MwCO is the molecular weight of carbon monoxide (28.01 grams per mole), HrNOx is the heat of formation of nitrogen oxides (heat of formation of nitric oxide is assumed to be about 38,600 BTU/lb and the heat of formation of nitrogen dioxide is assumed to be about 35,630 BTU/lb) and HHV is the higher heating value of fuel.

ix) Loss due to surface radiation is determined from the following equations

Use the larger of:

$$Hcaz = 0.2(TDi)^{1/3}$$

or $$Hcaz = 0.35 VAz^{0.8} \qquad (66)$$

in Equation (66).

$$Hraz = 0.847 + 2.637 \, E^{-3} TDi + 2.94 \, E^{-6} TDi^2 + 1.37 \, E^{-9} TDi^3 \qquad (67)$$

$$QpLSrc = \Sigma(Hcaz + Hraz)Afz(TMnAfz - TMnAz) \qquad (68)$$

and $$QpLSrc = 100 \frac{QrLSrc}{MrF \times HHV} \qquad (69)$$

where Hcaz is the convection heat transfer coefficient, Hraz is the radiation heat transfer coefficient, TDi is the surface temperature—ambient temperature assumed to be 50 except for surfaces known to be higher, Vaz is the air velocity near surface assumed to be 1.67 and Tdi and Vaz may be measured for the test and multiple areas or they may be assumed as noted above.

x) Loss due to additional moisture may be determined from Equations (70) and (71)

$$QrLWAd = \sum MrStz(HStLvCr - HWRe) \qquad (70)$$

$$QpLWAd = 100 \frac{QrLWAd}{MrF \times HHV} \qquad (71)$$

xi) Loss due to calcinations may be determined from Equations (72) and (73)

$$QrLClh = \sum MrSbk \times MFrClhk \times Hrk \qquad (72)$$

$$QpLClh = 100 \frac{QrLClh}{MrF \times HHV} \qquad (73)$$

xii) Loss due to water in sorbent may be determined from Equations (74) and (75)

$$QrLWSb = MrWSb(HStLvCr - HWRe) \qquad (74)$$

$$QpLWSb = 100 \frac{QrLWSb}{MrF \times HHV} \qquad (75)$$

xiii) Loss due to wet ashpit may be determined from Equations (76) and (77)

$$QrLAp = 10000 \times ApAf \qquad (76)$$

$$QpLAp = 100 \frac{QrLAp}{MrF \times HHV} \qquad (77)$$

xiv) Loss due to recycled streams are detailed below for recycled gaseous streams and for recycled solid streams.

(1) Recycled gaseous streams may be determined from Equations (78) and (79)

$$QrLRyFg = MrRyFg(HFgCr - HFgEn) \qquad (78)$$

$$QpLRyFg = 100 \frac{QrLRyFg}{MrF \times HHV} \qquad (79)$$

(2) Recycled solid streams may be determined from Equations (80) and (81)

$$QrLRyRs = MrRyRs(HRsLv - HRsEn) \qquad (80)$$

$$QpLRyRs = 100 \frac{QrLRyRs}{MrF \times HHV} \qquad (81)$$

xv) Loss from cooling water may be determined from Equations (82) and (83)

$$QrLCw = \sum MrCwn(HWLv - HWEn) \qquad (82)$$

$$QpLCw = 100 \frac{QrLCw}{MrF \times HHV} \qquad (83)$$

xvi) Loss due to internally supplied air preheating may be determined from Equations (84) and (85)

$$QrLAc = MrSt36(HW36 - HW24) \qquad (84)$$

$$QpLAc = 100 \frac{QrLAc}{MrF \times HHV} \qquad (85)$$

The ASME PTC 4 credits for calculating the efficiency are listed below.

i) Credit due to entering dry air may be determined from Equation (86)

$$QpBDA = 100 MqDA \times HDAEn \qquad (86)$$

where MqDA is the dry air in pounds per BTU and HDAEn is the enthalpy of dry air at air heat entering temperature.

ii) Credit due to moisture in air may be determined from Equation (87)

$$QpBWA = 100 MFrWA \times MqDA \times HWvEn \qquad (87)$$

where MFrWA is the specific humidity, MqDA is the mass of dry air in pounds per BTU and HWvEn is the enthalpy of water vapor at air heat entering temperature.

iii) Credit due to sensible heat in fuel may be determined from Equation (88)

$$QpBF = \frac{100}{HHV} HFEn \quad (88)$$

where HFEn is the enthalpy of fuel entering and HHV is the Higher Heating Value of fuel iv) Credit due to sulfation may be determined from Equation (89)

$$QpBSlf = MFrSc \frac{MpSF}{HHV} HRSlf \quad (89)$$

where MFrSc is the mass fraction of sulfur capture, MpSF is the mass percent sulfur in fuel, HRSlf is the heat of formation for sulfation and HHV is the Higher Heating Value of fuel.

v) Credit due to auxiliary equipment power is applied to steam driven equipment and to electrically driven equipment.

(1) For steam driven equipment it may be determined from Equations (90) and (91)

$$QrBX = MrStX \frac{HStEn - HStLv}{100} EX \quad (90)$$

$$QpBX = 100 \frac{QrBX}{MrF \times HHV} \quad (91)$$

where MrStX is the mass rate of steam supplied to the equipment, HStEn is the enthalpy of steam to the equipment, HStLv is the enthalpy of the steam leaving at the exit pressure and the entropy entering and EX is the overall drive efficiency; and (2) For electrically driven equipment it may be determined by Equation (92)

$$QpBX = 100 \frac{3412 \times QX \frac{EX}{100}}{MrF \times HHV} \quad (92)$$

where QX is the energy input to devices in kilowatt-hours (kWh) and EX is the overall drive efficiency.

vi) Credit due to sensible heat in sorbent $$QpBX = 100 \frac{MrSb \times HSbEn}{MrF \times HHV} \quad (93)$$

where MrSb is the mass rate of sorbent entering, HSbEn is the enthalpy of sorbent entering, MrF is the mass rate of fuel entering and HHV is the Higher Heating Value of fuel.

vii) Credit due to additional energy supplied by additional moisture may be determined by Equations (94) and (95)

$$QrBWAd = \sum MrStz(HStEnz - HWRe) \quad (94)$$

$$QpBX = 100 \frac{QrBWAd}{MrF \times HHV} \quad (95)$$

where MrStz is the mass flow rate of additional moisture, HStEnz is the enthalpy of additional moisture entering, HWRe is the enthalpy of water at a reference temperature, MrF is the mass rate of fuel entering and HHV is the Higher Heating Value of fuel.

The efficiency is then calculated by taking the sum of the sum of the losses and the sum of the credits.

Calculate efficiency $$EF = 100 - \Sigma QpL + \Sigma QpB \quad (96)$$

where EF is the efficiency, QpL is a symbol that represents the respective losses listed in Equations (52)-(85) and the respective credits in Equations (86)-(96).

In one embodiment, in order to continuously monitor the emissions of greenhouse gases from the steam generation system, the steam generation system comprises a fuel analysis database of the fuels fired at the facility. This database will store ultimate, proximate and HHV analysis for all samples analyzed. For each mine source, a composite average analysis on a moisture and ash free basis may be maintained. Periodic (daily to weekly or per train load) proximate analysis with the moisture and ash content may be used in conjunction with the running average ultimate analysis to compose the "online as received" composition. In the long run this methodology will achieve greater accuracy than the other limited forms of testing. On a moisture and ash free basis, the coal analysis from a given mine varies very little, so this information combined with frequent sampling and analysis of the moisture and ash content will enable the online system to use accurate fuel characteristics to calculate performance. This approach does not preclude the use of an "on line" fuel analysis monitor, the results of which may be incorporated either stand alone or in combination with the database presented above.

The aforementioned energy balance method for determining carbon emissions is generally more accurate than the hitherto used direct methods where the carbon content is determined by measuring the fuel flow into the steam generation system or the flue gas flow rate in the stack. Uncertainty analysis conducted on the energy balance method along with the direct method and other methods demonstrate this. The energy balance method has lower uncertainty limits than the direct method. This indicates the accuracy of the energy balance method.

This method is advantageous in that it significantly reduces the amount of uncertainty in the measurement of carbon dioxide. The accurate quantification of such emissions can provide valuable data on the effectiveness of various measures used to reduce these emissions. An accurate quantification can lead to the determination of the most effective methods to reduce these emissions thereby facilitating the development of newer methods to reduce carbon dioxide emissions to the environment.

In one embodiment, the uncertainty limits of the direct method are at least 20% less than the uncertainty limits of the energy balance method. In another embodiment, the uncertainty limits of the direct method are at least 30% less than the uncertainty limits of the energy balance method. In yet another method, the uncertainty limits of the direct method are at least 40% less than the uncertainty limits of the energy balance method.

The following examples, which are meant to be exemplary, not limiting, illustrate the accuracy of the energy balance method of measuring the carbon emissions according to various embodiments of the method described herein.

Example

This example was used to determine the carbon emissions as measured by three different methods. These methods were tested to determine which method was the most accurate and to determine which method provides consistently accurate results with a minimal standard deviation.

The three different methods are a) the energy balance method b) the direct method and c) the United States Environmental Protection Agency Continuous Emissions Monitoring System (US EPA CEMS) method from Part 75 Appendix F. The energy balance method is based on the boiler efficiency and energy output as detailed above. It is also called the energy balance method and is sometimes referred to as a heat loss method.

Several internationally recognized standards utilize this methodology such as ASME/ANSI PTC 4 Energy Balance Efficiency Method, the German DIN 1942 and the draft ISO standard, which closely follows the German DIN 1942 standard. All of these procedures are incorporated into this reference; however, each specific standard uses minor adjustments to fit an on-line calculation methodology. Due to the similarity of these procedures, the results of an uncertainty analysis will not be significantly different from those presented and detailed here, which are based on the ASME PTC 4 Energy Balance Efficiency Method as modified for an on-line calculation. Again due to the similarity of these standards, the modifications listed here are applicable to those standards as well.

Measurements made according to the energy balance method incorporate several non-standard measurements into the power plant configuration to improve the real time accuracy. These measurements include flue gas oxygen at the air heater outlet in a grid format, the size of which would be dependent upon the specific unit configuration and the size of the ducts. These are key features in that our method will depart for normal plant configuration by the installation of a grid for measuring oxygen. A temperature grid is installed at the air heater exit. These grids are individual measurements located at points in the flue duct leaving the air heater that are positioned at the approximate centers of equal areas in a plane perpendicular to the flow of the flue gas. The grid will consist of a minimum of 4 points for each oxygen and temperature measurement made, unless the size of the duct is less than or equal to about 100 square feet. Installing these grids provides a significant improvement in accuracy over other measurement methods.

A temperature grid is installed at the flue gas outlet of the air heater. While many other plants measure the temperature leaving the air heater, this measurement is based on a very limited number of temperature probes not properly distributed to get a representative measurement. The use of a temperature grid provides a more accurate measure at the flue gas outlet and at the air heater as compared with standard plants that have a very limited number of temperature probes. A verification of the feedwater flow measurement was made and steps taken to insure that the uncertainty of the flow is less than 1.5%.

In the direct method, the carbon dioxide emission is determined from the measured coal flow and fuel analysis. By knowing the percentage carbon in the fuel and the corresponding fuel flow, the tons of carbon dioxide may be determined directly. The Unites States Environmental Protection Agency Continuous Emission Monitoring System (US EPA CEMS) method uses the measured stack flow and the measured $CO_2$ in the stack to determine the $CO_2$ emissions. This methodology is detailed in Title 40 Part 75 Appendix F of the Code of Federal Regulations.

The data for this example was obtained by collecting a two-hour period of data from units that were operating at or near full load. This data consisted of a number of distributed control system (DCS) Tags. Data stored in the plants distributed control system where a tag is a specific measurement location which in combination with a timestamp provides a data value for a specific point in time, sampled every minute during the period. From this data the average value, the standard deviation and the number of samples were obtained.

The calculations of carbon dioxide according the energy balance method is listed above in Equation (13).

Calculation of $CO_2$ Using the Direct Method

The following Equation (97) is used to calculate the $CO_2$ emissions using the direct method:

$$CO_2 = \frac{\% \text{ Carbon}}{100} \times \text{Coal Flow} \times \frac{44.0}{12.0} \tag{97}$$

where $CO_2$=Carbon Dioxide in the same units as the coal flow; % Carbon=Percent carbon by weight in the fuel; and coal flow=mass flow of coal in pounds per hour or tons per hour.

Calculation of $CO_2$ Using the CEMS Method

The US EPA specifies in Title 40 Part 75 Appendix F the procedure to use to determine the $CO_2$ emissions when using a CEMS. EPA Eq. F-11 is presented as Equation (98) below:

$$E_h = KC_hQ_h \tag{98}$$

where $E_h$ is an hourly carbon dioxide mass emission rate during unit operation, tons per hour; $K=5.7\times10^{-7}$ for carbon dioxide (tons per standard cubic feet per percentage of carbon dioxide; $C_h$ is the hourly average carbon dioxide concentration during unit operation, wet basis, either measured directly with a carbon dioxide monitor or calculated from wet-basis oxygen data using Equation F-14b, percent carbon dioxide and $Q_h$ is the hourly average volumetric flow rate during unit operation, wet basis, in standard cubic feet-hours.

Uncertainty Calculations

For each parameter, the average value, the standard deviation and the number of samples are recorded. These values are used to determine the random component of the uncertainty. For each input parameter, values of the standard deviation, the standard deviation of the mean and the random component of uncertainty are determined by the following equations.

The Standard Deviation of the sample is measured by using the equation (99)

$$S_x = \sqrt{\sum_{i=1}^{N} \frac{(X_i - \overline{X})^2}{(N-1)}} \tag{99}$$

where $S_x$ is the standard deviation of the sample; X is the average of $X_i$; N is the number of points and i is the point number. After the Standard Deviation is determined, the Standard Deviation of the Mean is determined from Equation (100) as follows:

$$\overline{S}_x = \frac{S_x}{\sqrt{N}} \tag{100}$$

where $\overline{S}_x$ is the Standard Deviation of the Mean; $S_x$ is the Standard Deviation of the sample; and N is the Number of Points.

The impact each input has on the final result is taken into account by determining the Absolute Sensitivity Coefficient. This coefficient is the change in the result per unit of input change and is expressed as follows:

$$\theta = \frac{(\Delta R)}{(\Delta X)} \quad (101)$$

where $\theta$ is the absolute sensitivity coefficient; $\Delta R$ is the change in the result for a given change in the input parameter and $\Delta X$ is the change in the input parameter.

Once these values have been determined for each input parameter the Random Component of the Uncertainty can be calculated as follows:

Random Uncertainty of Result $$S_R = \sqrt{\sum_{i=1}^{N} (\theta_i' \overline{S}_x)^2} \quad (102)$$

$S_R$ is the Random Uncertainty of Result, $\theta_i'$ is the Absolute Sensitivity Coefficient for parameter i, $\overline{S}_x$ is the Standard Deviation of the mean and N is the Number of Input Points.

In addition to the random component of uncertainty for each parameter, a systematic component of uncertainty is also estimated. For this analysis the estimates were made on a general type of instrument.

Table 1 below shows the estimates used for this analysis:

TABLE 1

| Parameter | Positive** % | UOM* | Negative % | UOM |
|---|---|---|---|---|
| Steam & Water Temp | 0.81 | 2.02 | 0.81 | 2.02 |
| Steam & Water Pressure | 0.18 | 0.30 | .018 | 0.30 |
| FW Flow | 1.01 | 0.00 | 1.00 | 0.00 |
| Flow - Other | 1.50 | 0.00 | 1.50 | 0.00 |
| Air and Gas Temp | 0.81 | 6.00 | 0.81 | 6.00 |
| Air and Gas Pressure | 0.18 | 0.30 | 0.18 | 0.30 |
| Oxygen in Flue Gas | 1.00 | 0.10 | 1.00 | 0.10 |
| Relative Humidity | 1.00 | 0.00 | 1.00 | 0.00 |
| CO in Flue Gas | 2.45 | 0.00 | 2.45 | 0.00 |
| Coal Flow | 5.59 | 0.00 | 5.59 | 0.00 |
| CO2 in Flue Gas | 2.00 | 0.67 | 2.00 | 0.67 |
| Stack Flow | 5.12 | 0.00 | 5.12 | 0.00 |
| EPA K Factor for CO2 | 3.80 | 0.00 | 1.50 | 0.00 |
| Turbine Leakage | 100.00 | 0.00 | 0.00 | 0.00 |
| HHV | 0.00 | 83.00 | 0.00 | 83.00 |
| Carbon | 0.93 | 0.00 | 0.93 | 0.00 |
| Hydrogen | 1.11 | 0.00 | 1.11 | 0.00 |
| Nitrogen | 0.67 | 0.00 | 0.00 | 0.00 |
| Oxygen | 0.00 | 0.00 | 0.00 | 0.00 |
| Sulfur | 0.07 | 0.00 | 0.07 | 0.00 |
| Moisture | 0.25 | 0.00 | 0.25 | 0.00 |
| Ash | 0.25 | 0.00 | 0.25 | 0.00 |
| Fixed Carbon | 0.00 | 0.00 | 0.00 | 0.00 |
| Volatile Matter | 0.00 | 0.40 | 0.00 | 0.40 |

*UOM = unit of measure
**deviations that might be present from a reading or the bias or systematic error.

The total uncertainty is the combination of the random and the systematic, formerly called precision and bias respectively, components. The random component is adjusted by using the t-factor (Student's t) to adjust for a 95% confidence interval. The systematic component estimates should be made at the same confidence interval as the random component. For a 95% confidence interval with more than 20 measurements the t-factor is assumed to be 2. The results of this analysis clearly show that the energy balance method (i.e., the method detailed herein) yields the lowest uncertainty of the three methods for both customers. Table 2 below shows the results.

TABLE 2

| | Avg. Value | Total Positive % | Tons | Total Negative % | Tons | t-factor | Random Component Tons | Positive Systematic Tons | Negative Systematic Tons |
|---|---|---|---|---|---|---|---|---|---|
| Customer 1 | | | | | | | | | |
| Energy balance method | 628.84 | 2.0% | 12.59 | 2.0% | 12.45 | 2 | 0.26 | 12.58 | 12.44 |
| Direct Method | 735.26 | 5.7% | 41.68 | 5.7% | 41.68 | 2 | 0.56 | 41.67 | 41.67 |
| CEMS | 609.14 | 8.3% | 50.36 | 7.5% | 45.65 | 2 | 0.36 | 50.35 | 45.64 |
| Customer 2 | | | | | | | | | |
| Energy balance method | 176.54 | 1.7% | 3.04 | 1.7% | 2.99 | 2 | 0.11 | 3.03 | 2.98 |
| Direct Method | 191.54 | 5.7% | 10.86 | 5.7% | 10.86 | 2 | 0.11 | 10.85 | 10.85 |
| CEMS | 180.47 | 8.8% | 15.82 | 8.0% | 14.51 | 2 | 0.35 | 15.81 | 14.50 |

From the Table 1 and 2 it may be seen that both the direct method and the CEMS method rely on a flow measurement that tends to be inaccurate. In the case of the direct method, the flow measurement is the coal flow. Coal, being a non-homogeneous solid fuel is difficult to measure even with a modern gravimetric feeder. This is due to the size variation of the coal itself as well as the placement of the coal on the weigh belt. Older units do not have gravimetric feeders but rather volumetric feeders that count the revolutions of the wheel and assume a coal volume and density.

In the case of the CEMS stack flue gas flow is measured. The stack flow is calibrated using an S-type pitot tube traverse, or at best a 3-hole probe. These probes have an inherently poor accuracy in the 4 to 8% range.

Figure 2:
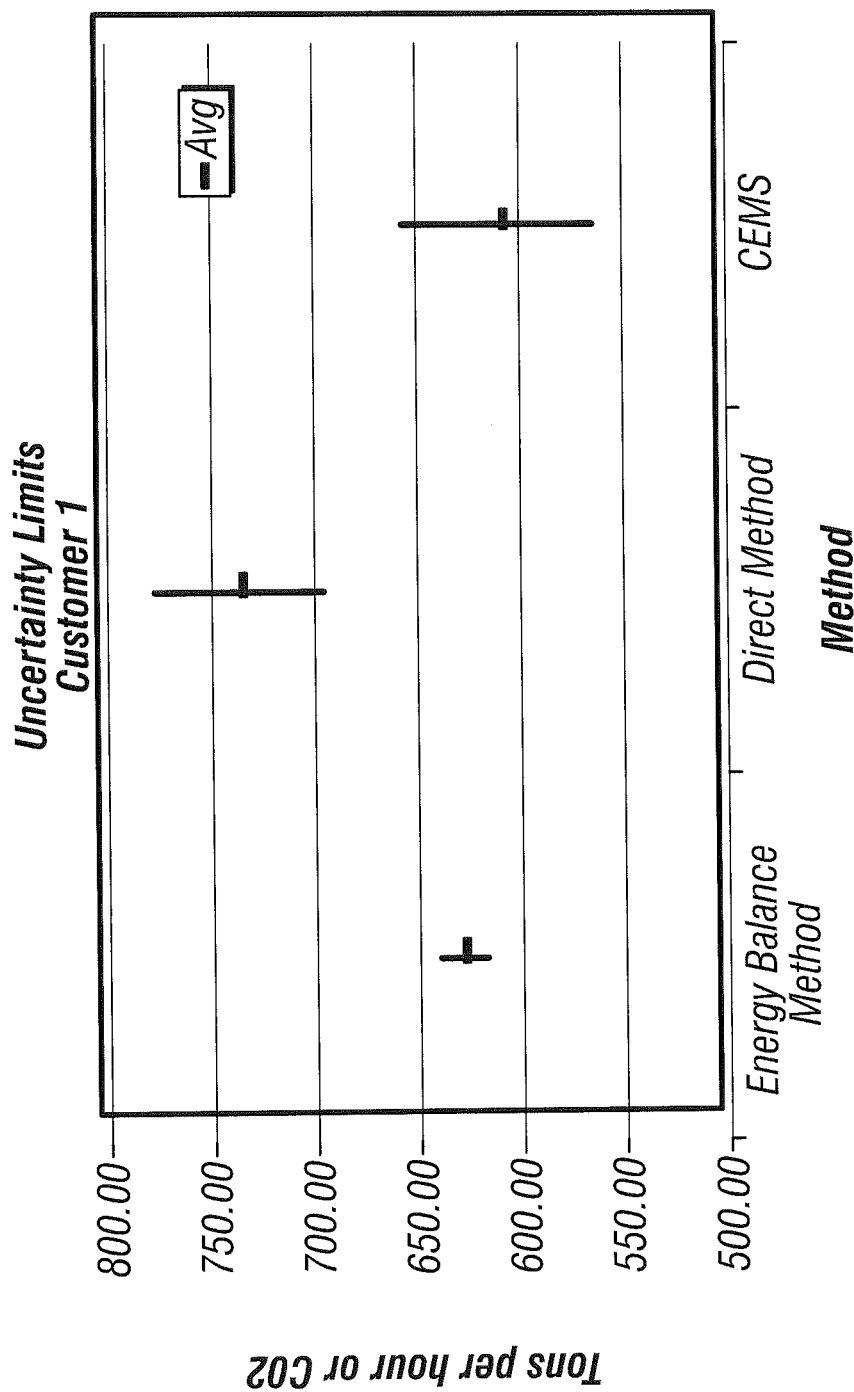
FIG. 2 is a graphical representation of the uncertainty limits for the energy balance method, the direct method and the CEMS method.
Figure 3:
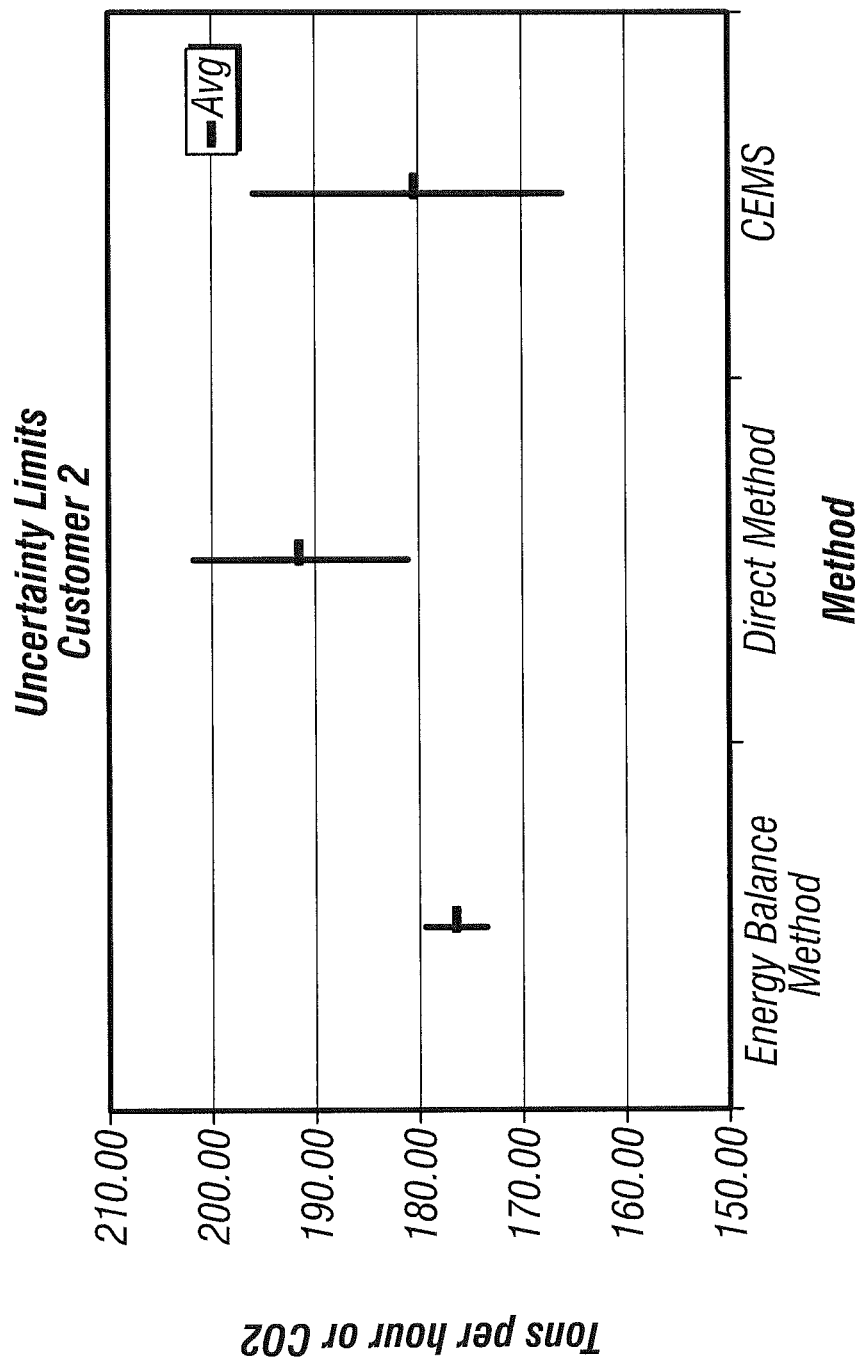
FIG. 3 is another graphical representation of the uncertainty limits for the energy balance method, the direct method and the CEMS method.

The FIGS. 2 and 3 show a comparison between the 3 types of measurements. From the FIGS. 2 and 3 it may be seen that the direct method yields a higher value and the range of estimated uncertainty fails to cover the other two measured values. This indicates that the uncertainty estimate for the direct method is probably too low and values closer to the 8% range may be a better estimate of the systematic error.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method comprising:
measuring a first energy of feedwater entering into a steam generation system; where the steam generation system is a boiler;
measuring a second energy of steam or water exiting the steam generation system;
subtracting a difference between the first energy and the second energy to determine a total energy absorbed by the steam generation system;
dividing the total energy absorbed by the steam generation system by an efficiency of the steam generation system to determine a heat input to the steam generation system;
determining the carbon emissions from the heat input to the steam generation system; where the heat input is obtained from the combustion of carbon based fuels; and
controlling the carbon emissions by adjusting a flow of feedwater or steam; where the first energy and the second energy are both heat energies related to the mass and enthalpy of the feedwater entering into the steam generation system and the steam of water exiting the steam generation system respectively; and where the carbon emissions can be determined from the Equations below:

$$MqCO_2 = \frac{MFrCF}{HHV} \times \frac{MW_{CO2}}{MW_C} \times 10^6 \text{ pounds of carbon dioxide per million } BTU,$$

$$MeCO_2 = \frac{MqCO_2}{kW} \times Q_{FIRED} \text{ pounds of carbon dioxide per kilowatt,}$$

and $$MteCO_2 = \frac{MqCO_2}{2000} \times Q_{FIRED} \text{ tons of carbon dioxide per hour,}$$

$MqCO_2$, $MeCO_2$ and $MteCO_2$ are masses in pounds per BTU of carbon dioxide, mass of carbon dioxide emissions on a per kW basis and mass of carbon dioxide emissions on a ton per hour basis respectively, MFrCF is the mass fraction of carbon in the fuel, $MqCO_2$ is a mass in pounds per BTU of carbon dioxide, $MW_{CO2}$ is the molecular weight of carbon dioxide respectively, $MW_c$ is the molecular weight of carbon and $Q_{FIRED}$ is the heat input to the steam generation system.

2. The method of claim 1, further comprising measuring flue gas oxygen content and flue gas temperature in a grid at an exit of an air heater.

3. The method of claim 1, further comprising periodically sampling fuel and ash from the steam generation system and analyzing the fuel and the ash.

4. The method of claim 3, further comprising maintaining a database of the analysis of fuel and ash and using data from the database to accurately determine the heat input to the steam generation system.

5. The method of claim 4, wherein the database is used to compile a historical record; the historical record being used to analyze yields that provide the lowest uncertainty.

6. The method of claim 5, wherein analyzing the yields that provide the lowest uncertainty is conducted on a moisture and ash-free basis in addition to an as-received basis; the as-received basis pertaining to as-received fuel.

7. The method of claim 1, where the amounts of nitrogen oxides, sulfur dioxides and carbon monoxide are determined using the equations below:

$$MeEm = \frac{MqEm}{kW} \times Q_{FIRED} \text{ lb } Em/kW,$$

and $$MteEm = \frac{MqEm}{2000} \times Q_{FIRED} \text{ } Em \text{ Tons/}hr,$$

where MqEm, MeEm and MteEm are masses in pounds per BTU, the mass of emissions on a per kW basis and mass of emissions on a ton per hour basis of either nitrogen oxides, sulfur dioxides or carbon monoxide emissions respectively, and where $Q_{FIRED}$ is the heat input to the steam generation system.

8. The method of claim 1, where the total energy absorbed by the steam generation system is obtained from $$Q_{BLR} = Q_{MS} + Q_{MSspray} + Q_{Bd} + Q_{SB} + Q_{AUX} + Q_{RH} + Q_{RHspray},$$

where $Q_{MS}$ is a total energy of a main steam; $Q_{MSspray}$ is a total energy of a spray introduced into the main steam, $Q_{Bd}$ is a total energy of a blow down steam, $Q_{SB}$ is a total energy of a sootblowing steam, $Q_{AUX}$ is a total energy of an auxiliary steam, $Q_{RH}$ is a total energy of a reheat steam and $Q_{Rhspray}$ is a total energy of a spray introduced into a reheat steam.

9. The method of claim 8, where the total energy of the main steam $Q_{MS}$ is determined by $$Q_{MS} = (M_{FW} - M_{SB} - M_{Bd} - M_{Aux})(H_{MS} - H_{FW}),$$

where $M_{FW}$ is a mass of the feedwater, $M_{SB}$ is a mass of the sootblowing steam, $M_{Bd}$ is a mass of the blowdown water, $M_{Aux}$ is a mass of the auxiliary steam, $H_{MS}$ is an enthalpy of the main steam, $H_{FW}$ is an enthalpy of the feedwater.

10. The method of claim 8, where the total energy of the sootblowing steam is determined by:

$$Q_{SB} = M_{SB}(H_{sb} - H_{FW}),$$

where $Q_{SB}$ is a total energy of a sootblowing steam, $M_{SB}$ is a mass of the sootblowing steam, $H_{FW}$ is an enthalpy of the feedwater and $H_{sb}$ is the enthalpy of the sootblowing steam.

11. The method of claim 8, where the total energy of the blowdown $Q_{Bd}$ water is determined by:

$$Q_{Bd}=M_{Bd}(H_{bd}-H_{FW}),$$

where $M_{Bd}$ is a mass of blow down water, $H_{FW}$ is the enthalpy of feedwater and $H_{bd}$ is the enthalpy of the blowdown water at saturated conditions of drum pressure.

12. The method of claim 8, where the total energy of the auxiliary steam $Q_{AUX}$ is determined by:

$$Q_{AUX}=M_{AUX}(H_{AUX}-H_{FW}),$$

where $M_{AUX}$ is the mass of auxiliary steam, $H_{FW}$ is the enthalpy of feedwater and $H_{AUX}$ is the enthalpy of the auxiliary steam.

13. The method of claim 8, where the total energy absorbed by sprays to the main steam is determined by:

$$Qr_{MSspray}=Mr_{MSspray}(H_{MS}-H_{MSspray}),$$

where $Qr_{MSspray}$ and $Mr_{MSspray}$ are an energy rate of a spray to the main steam and a mass rate of the spray to the main steam respectively, $H_{MS}$ is an enthalpy of the main steam and $H_{MSspray}$ is an enthalpy of a spray to the main steam.

14. The method of claim 8, where the total energy absorbed in the reheat steam is determined by:

$$Qr_{RH}=Mr_{CRH}(H_{HRH}-H_{CRH}),$$

where $Qr_{RH}$ and $Mr_{CRH}$ are the energy rate and the mass rate of the reheat steam respectively and $H_{HRH}$ and $H_{CRH}$ are the enthalpy of the hot reheat steam and the cold reheat steam respectively.

15. The method of claim 8, where the total energy absorbed by sprays to the reheat steam are provided below:

$$Qr_{RHspray}=Mr_{RHspray}(H_{HRH}-HRH_{RHSpray})$$

where $Qr_{RHspray}$ and $Mr_{RHspray}$ are an enthalpy rate and a mass rate for the spray to the reheat steam, $H_{HRH}$ and $HRH_{RHSpray}$ is an enthalpy for hot reheat steam and an enthalpy for a spray for the reheat steam respectively.

16. The method of claim 1, further comprising determining the fuel flow to the steam generation system by:

$$M_{fuel} = \frac{Q_{FIRED}}{HHV \times 2000} \text{ tons per hour}$$

where $Q_{FIRED}$ is the heat input to the steam generation system and HHV represents the higher heating value.

17. The method of claim 1, further comprising determining the amount of dry air entering the boiler ahead of a location z by $$MqDAz = MqThACr\left(1 + \frac{XpAz}{100}\right) \text{ pounds per } BTU,$$

where MqDAz represents the mass in pounds per BTU of dry air at location z, MqThACr represents the mass in pounds per BTU of theoretical air in pounds per pound of fuel and XpAz represents the excess air based on an oxygen volume wet basis at location z.

18. The method of claim 1, further comprising determining the wet air entering the boiler ahead of a location z by $$MqAz=(1+MFrWA)MqDAz \text{ pounds per BTU}$$

$$MFrAz=(1+MFrWA)MFrDAz \text{ pounds per pound of fuel}$$

MqAz represents the mass in pounds of dry air at location z, MFrAz represents the mass fraction in pounds per pound of fuel at location z, MFrWA is the mass fraction of wet air, MqDAz represents the mass in pounds per BTU of dry air at location z and MFrDAz represents the mass fraction of dry air at location z.

19. The method of claim 1, further comprising determining the wet gas from fuel by:

$$MqFgF = \frac{(100 - MpAsF - MpUbC - MFrSc \times MpSF)}{100 \times HHV}$$

where the terms MqFgF is the mass in pounds per BTU of wet gas in fuel, MpAsF is the mass percent of ash in fuel, MpUbC is the mass percent of unburned carbon, MFrSc is the fractional mass of captured sulfur, MpSF is the mass percent of sulfur in fuel.

20. The method of claim 1, further comprising determining the total wet flue gas weight in pounds per BTU by $$MqFgz=MqDAz+MqWAz+MqFgF+MqCO_2Sb+ \\ MqWSb+MqWADz$$

where MqFgz is the mass in pounds per BTU of wet gas in fuel at a location z, MqDAz represents the mass in pounds per BTU of dry air at location z, MqWAz represents the mass in pounds per BTU of wet air at location z, MqFgF is the mass in pounds per BTU of wet gas in fuel, $MqCO_2Sb$ is the mass in pounds per BTU of carbon dioxide in sorbent, MqWSb is the mass in pounds per BTU of wet sorbent and MqWADz is the mass in pounds per BTU of moisture added per pound of fuel fired.

21. The method of claim 1, further comprising determining the theoretical air corrected for carbon burned by:

$$MFrThACr=0.1151\times MpCb+0.3430\times MpH_2F+0.0431\times \\ MpSF(1+0.5MFrSc)-0.0432\times MpO_2F$$

where MFrThACr is the theoretical air corrected for carbon burned in pounds per pound of fuel, where MFrSc is the mass fraction of sulfur capture and where MpCb, $MpH_2F$, MpSF and $MpO_2F$ are the mass percent of carbon, the mass percent of hydrogen in fuel, the mass percent of sulfur in fuel and the mass percent of oxygen in fuel respectively.

22. The method of claim 1, where an efficiency of the steam generation system is determined by a modified ASME PTC 4 methodology.

23. The method of claim 1, where the steam generation system is a boiler.

24. A method comprising:
  calculating the total energy absorbed by a working fluid in a boiler as it undergoes a change of state;
  dividing the total energy absorbed by the boiler by an efficiency of the boiler to determine a heat input to the boiler; and
  determining carbon emissions from the heat input to the boiler; and
  controlling the carbon emissions by adjusting a flow of feedwater or steam; and where the carbon emissions can be determined from the Equations below:

$$MqCO_2 = \\ \frac{MFrCF}{HHV} \times \frac{MW_{CO_2}}{MW_C} \times 10^6 \text{ pounds of carbon dioxide per million } BTU,$$

-continued $$MeCO_2 = \frac{MqCO_2}{kW} \times Q_{FIRED} \text{ pounds of carbon dioxide per kilowatt,}$$

and $$MteCO_2 = \frac{MqCO_2}{2000} \times Q_{FIRED} \text{ tons of carbon dioxide per hour,}$$

$MqCO_2$, $MeCO_2$ and $MteCO_2$ are masses in pounds per BTU of carbon dioxide, mass of carbon dioxide emissions on a per kW basis and mass of carbon dioxide emissions on a ton per hour basis respectively, MFrCF is the mass fraction of carbon in the fuel, $MqCO_2$ is a mass in pounds per BTU of carbon dioxide, $MW_{CO2}$ is the molecular weight of carbon dioxide respectively, $MW_c$ is the molecular weight of carbon and $Q_{FIRED}$ is the heat input to the steam generation system.

25. The method of claim 24, where the working fluid is water.

26. The method of claim 24, where the calculating the total energy absorbed by the working fluid comprises measuring a first energy of the working fluid as it enters the boiler and a second energy of the working fluid as it exist the boiler and subtracting the first energy from the second energy.

27. The method of claim 26, where the first energy is an energy of feedwater as it enters the boiler.

28. The method of claim 27, wherein the energy of feedwater is determined by repeatedly verifying feedwater flow measurement to where an uncertainty of flow is less than 1.5%.

29. The method of claim 26, where the second energy is an energy of steam as it exits the boiler.

30. The method of claim 24, where an efficiency of the steam generation system is determined by a modified ASME PTC 4 methodology.

* * * * *